INVENTOR
ALFRED RAYMOND DE BEAUSACQ
By Young + Thompson
ATTYS.

Oct. 1, 1968  A. R. DE BEAUSACQ  3,403,921
SHOE-SECURING SYSTEM FOR SKIS
Filed June 27, 1966  6 Sheets-Sheet 2
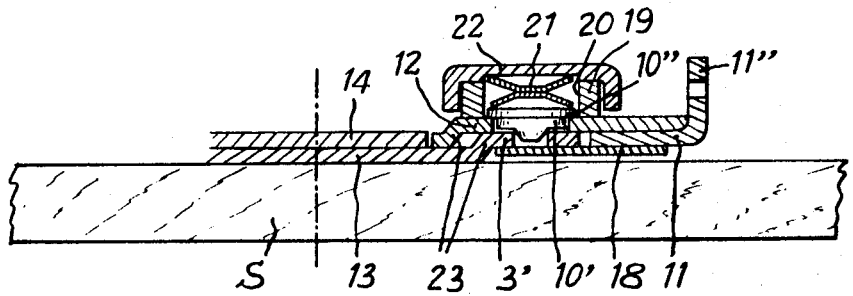
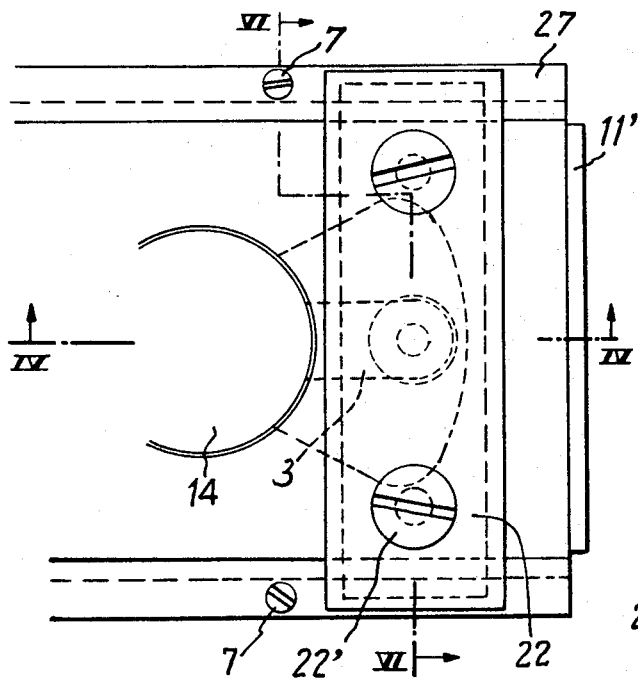
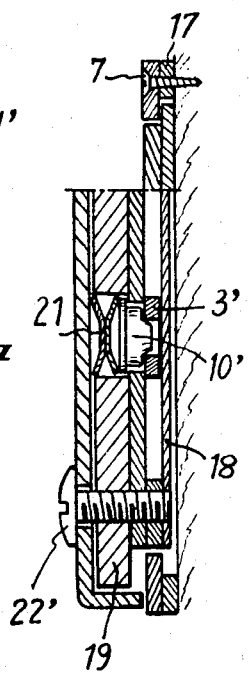
INVENTOR
ALFRED RAYMOND DE BEAUSACQ
BY Young + Thompson
ATTYS.

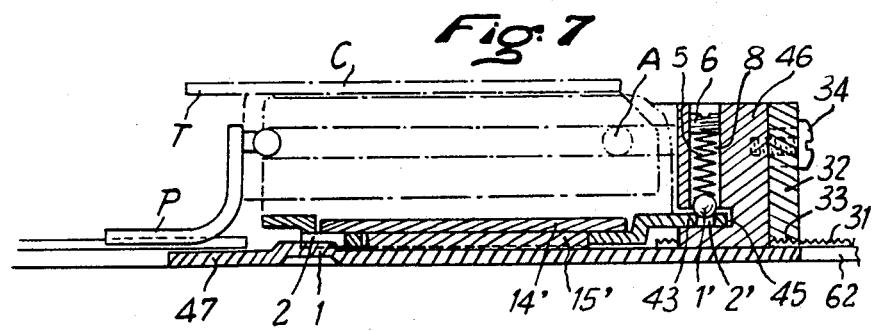
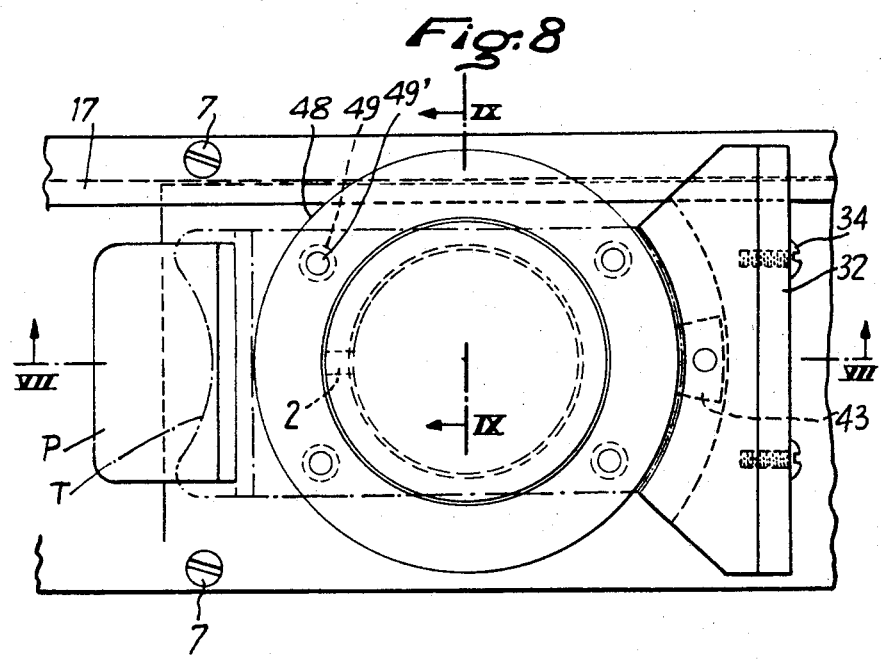
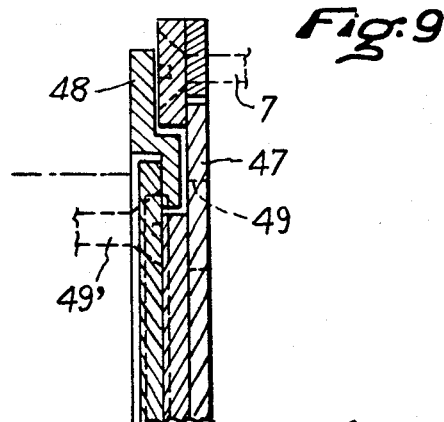

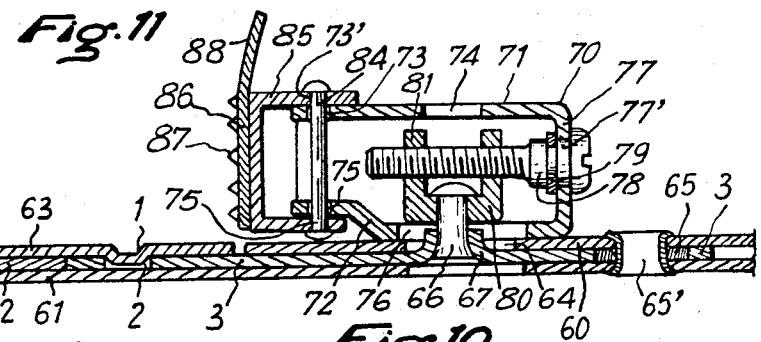
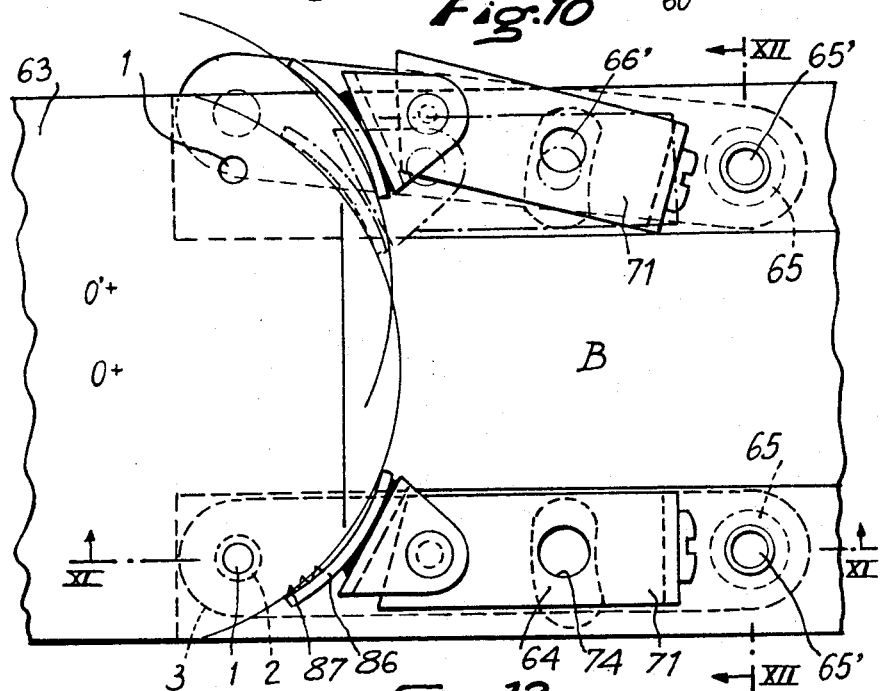
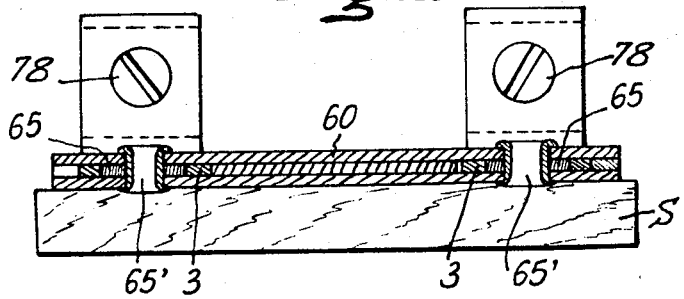

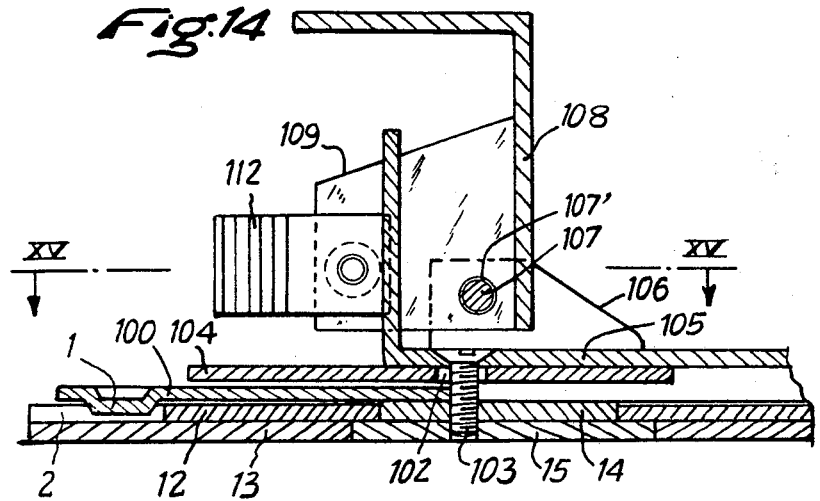
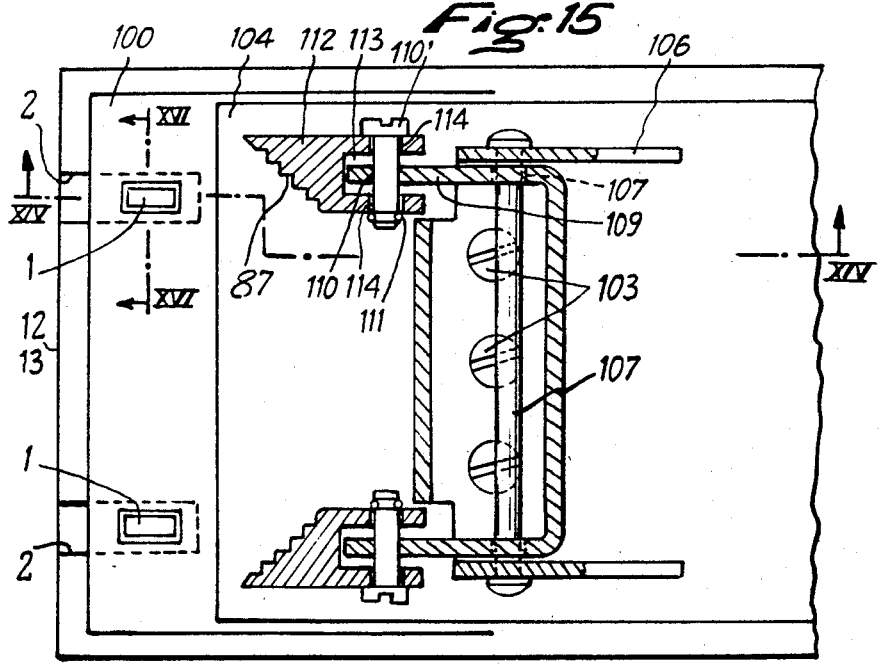
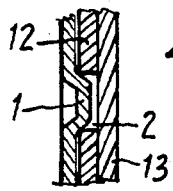

United States Patent Office 3,403,921
Patented Oct. 1, 1968

3,403,921
SHOE-SECURING SYSTEM FOR SKIS
Alfred Raymond de Beausacq, 4 Rue Gustave Courbet, Paris, France
Filed June 27, 1966, Ser. No. 560,584
7 Claims. (Cl. 280—11.35)

ABSTRACT OF THE DISCLOSURE

A shoe-securing system to be fitted in a ski between a front stop and a rear block adapted to rock round a vertical axis and round a horizontal axis, wherein two superposed discs coaxial with the geometrical line defining the vertical axis of the block and the diameter of which approximates the breadth of the ski, said discs being rigid respectively with the ski and with the block, whereby the tractional action exerted by the heel and passing substantially through the axis of the discs is absorbed by a large frictional area.

---

In shoe-securing means for skiers incorporating a cable and provided with lateral safety means, against twisting the release of the fact is of necessity obtained by a shifting of the front end of the foot, since the heel is held fast to either side by the cable. Said shifting results according to the nature of the snow underneath the shoe sole in large variations in frictional values which makes the adjustment of the safety system a difficult matter.

Furthermore, when falling under twisting conditions and facing slightly forwardly, the first third of the shoe is subjected to the entire weight of the skier's body and becomes the natural center of pivotal movement for the torque transmitted to the foot by the leg which has first a tendency to urge the heel laterally. The fact of opposing such a shifting is physiologically absurd, since the skier's ankles are not adapted to transmit a torque varying between 300 and 800 kg./sq. cm. and to which is added the torque required for overcoming to the front of the foot the resistance of the pivotal stop. In contradistinction, the muscles of the foot reinforce considerably the ankles when it is necessary to shift laterally the entire heel. Already in 1941, the inventor Alfred Raymond de Beausacq proposed in his French Patent 972,341 a so-called cableless securing system. The sole of the shoe was held in said patent between a stop at the front and a block to the rear of the heel. Said block provided axial safety against forward falling and a lateral safety. In the latter case, the release was obtained whenever the lateral stress exerted by the heel was higher than the safety resistance opposing the rotation of the block pivotally secured to the rear of the heel round a pivot of a comparatively reduced diameter.

It is only recently that numerous shoe securing means incorporating no cable have appeared on the market, but it seems that the arrangement according to the French Patent 1,350,289 to Manufattura Mario Colombo is the only one showing the same advantage as our above-mentioned French patent since it covers a securing system incorporating no cable. It includes a block to the rear of the heel, pivoting round a sleeve of a comparatively reduced diameter through which passes a pivot secured to the ski. In fact, said Patent 1,350,289 covers the actual axial safety means whereas we have disclosed in the present specification means for applying our invention to different types of axial safety means in an altogether different manner.

In order to understand the advantages of the present invention it is however necessary to describe with some detail the actual state of the art.

The inventor, Alfred Raymond de Beausacq has always searched in his different prior patents means reducing the resistance or resistances opposing the pivotal movement of the foot when the heel rises. Said reduction increases considerably the efficiency when the skier falls under the torsional conditions whereas it shows no drawback in the case of smooth turns. The latter however do not require nowadays any rising of the heel but only a release of the weight applied on the heels. Now, in the above-mentioned Patent 972,341, said reduction in resistance, although it is obtained mechanically was opposed by the frictional action of the parts urging the rear block against the ski. Still more, without this mechanical reduction which does not exist in the above-mentioned French Patent 1,350,289, the resistance against pivotal movement increases instead of being reduced with the rising of the heel and consequently the lateral safety is unreliable, chiefly in the case of an overhanging when the pivoting element is held in position only by a member of a comparatively reduced diameter which is not located near the vertical line along which the heel exerts a tractional action.

This double drawback is reduced at least to a very large extent by the present invention incorporated with certain types of axial safety, since there remains still a tractional action of the members engaging the groove in the heel serving also as elements opposing the shifting of the heel; however said tractional stress passes, in the case of our invention very near the center of the circular means which are almost as broad as the ski which ensures a pivotal movement of the block and its holding in position with reference to the ski. In fact, in a modification the said drawbacks are entirely cut out.

The shape of the block and the design of said safety means require a holding fast of said block on the ski and therefore the part or parts of said blocks forming the elements holding laterally the heel fast are either reduced or entirely cut out. Said parts holding fast the heels against shifting are replaced according to the present invention by two elements extending laterally. Thus, these elements are subjected to no vertical tractional effect.

Such large diameter means are used in the French patents to Beyl and Marker but they are positioned underneath the heel so as to hold it fast entirely and they cannot obviously include any means resisting the pivotal movement, since their object consists in fact in furthering slightly the shifting of the front of the foot. Furthermore, the novel means provided by applicant allow enclosing completely the parts providing resistance against the pivotal movement in order to prevent any risk of freezing.

For sake of convenience, the references 1, 2, 3, 4 designate as in applicant's original second French specification respectively the male element, female element, pivotal element and stationary part.

In the accompanying drawings: FIG. 1 is an explanatory diagram. FIGS. 2 and 3 illustrate a first embodiment. FIGS. 4 to 6 illustrate a second embodiment. FIGS. 7 to 9 illustrate a third embodiment and FIGS. 10 to 12 a modification wherein the heel is held fast by pivotal flaps secured to the sides of the fixed rear block.

FIGS. 13 to 16 illustrate an arrangement wherein the block pivots round a horizontal axis and carries similar pivoting flanges.

FIGS. 14 to 16 illustrate a last embodiment.

In the accompanying drawings given by way of example, the front of the ski is always drawn on the left-hand side or at the upper end of the different figures.

Figure 1:
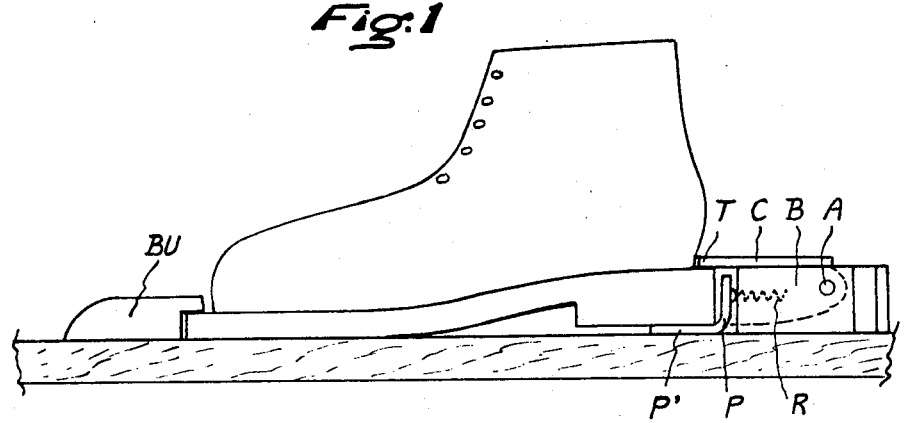

FIG. 1 illustrates diagrammatically in elevational view the principle of safety binding means incorporating no cable. The sole of the shoe is held on the ski S to the front thereof by a stop BU which may pivot or otherwise and to the rear by the block B capped by a cover C pivotally secured at A to the block. The arcuate surface T also forms generally the element holding the heel fast against lateral shifting and opposing the raising of the heel by means of a safety R carried inside the block and cooperating with the lateral and transverse vertical edges of the cover which extends so as to form a horizontal pedal P' intended for automatic engagement of the shoe.

Figure 2:
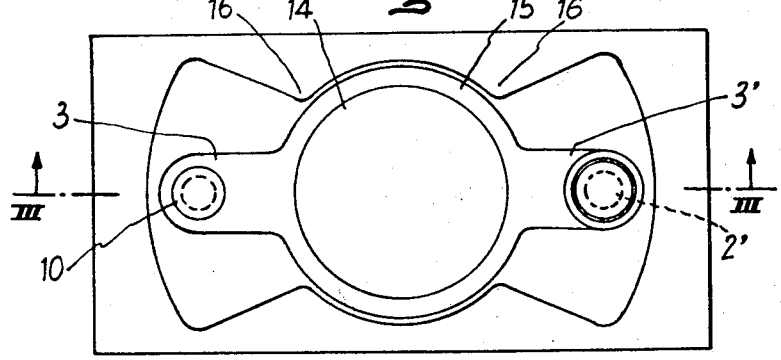
Figure 3:
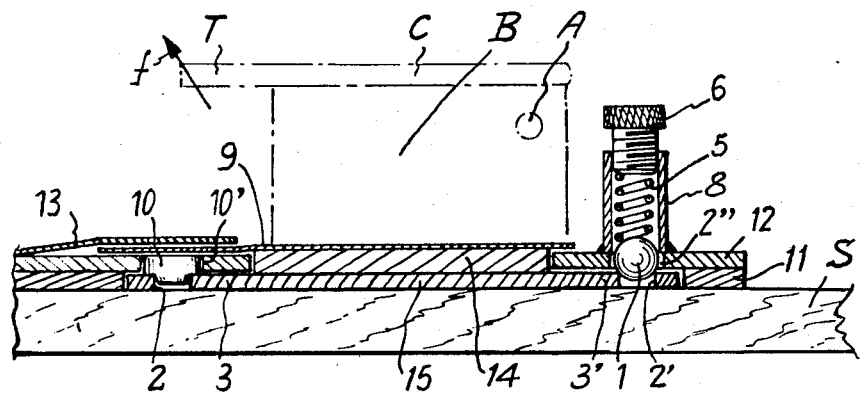

In the improved arrangement according to our invention as illustrated in FIGS. 2 and 3, the block B is secured by any suitable means on an upper circular disc 14 welded to a lower disc 15 provided with lugs 3 and 3' and forming the pivotal member. The rear lug is provided with an opening 2' forming the female element of a yielding locking system. Said opening engages a male element constituted by a ball 1' urged by a spring 5 subjected to the pressure of an adjustable screw 6 screwed into a tube 8 secured to an upper plate 12 provided with a hole 2" for this purpose.

Underneath this upper stationary plate is welded or rivetted a lower plate 11 including two solid sectors 16. The thickness of said plate is slightly larger than that of the discs 15 and of its lugs 3, 3'. Between the block B and the upper disc 14 is secured a broad washer 9 preferably of plastic material.

Although the resistance provided by the ball 1' and opening 2' may be used alone, there is also provided a pivotal resistant element 3 in which an opening 2 forms the female part 2 inside which is fitted the frusto-conical section of a washer 10 the cylindrical section of which is housed in an opening 10' in a plate 12 forming the stationary part 4. A thin plate 13 protects the washer 10 against the action of snow.

It is apparent that the washer 9 protects the periphery of the disc 14 against freezing, and the tube 8 engages the plate 12 so as to form an excellent protection of the ball against freezing. On the other hand, it is apparent that the traction of the heel is exerted in the direction of the arrow f and cannot produce the overhanging referred to hereinabove.

FIGS. 4, 5 and 6 illustrate a frusto-conical washer 10' replacing the ball to the rear and provided with a collar 10". The solid sector or lug 3' includes an extension which is sufficiently bent at 23 (FIG. 4) in the same manner as the plates 13 and 14 so that a transverse strip 18 secured under the lower plate does not rest on the ski, even if the latter is slightly bulging in a transverse direction.

A bar 19 of a rectangular cross-section secured over the plates is provided with a circular recess 20 housing the elastic Belleville washers 21 projecting slightly above the bar above which the screws 22' secure a strip 22 bent into the shape of an inverted U to adjust the pressure of the washers.

The upward raising 11' of the edge of the plate 11 will be referred to hereinafter.

It is apparent that the traction executed by the heel in the direction of the arrow f (FIG. 2) is absorbed almost completely by the half periphery of the lower disc or plate underneath the upper plate. The pivotal movement of the block holding the heel fast is opposed by the constant resistance produced by the ball 1' (FIG. 2) or by the frusto-conical washer 10'. This constant resistance may be resorted to alone but it is advantageous to add thereto to the front a proportional resistance which is the result of the engagement of the heel over the frusto-conical washer 10.

The bending at 23 and the transverse strip 18 illustrate one of the means preventing any flexing, whereby the bending or transverse flexing of the ski cannot modify the constant resistance.

Instead of securing the arrangement on the ski by wood screws passing through the ski, it is possible to resort to one of the known means allowing a longitudinal movement of the block with reference to the plates or else of the whole arrangement; the upward raising of the rear edge of the plate 13 at 11' is of interest for such an adjustment in association with the slideways 17 holding the plate 11 fast against the ski.

FIGS. 7 to 9 illustrate means allowing the pivotal movement and the holding fast of the heel on a ski which is somewhat similar to those proposed by Beyl and Marker, as already mentioned. But instead of attempting as in prior art to allow a lateral movement of the heel, the latter is, in contradistinction, in the case of said prior art, held fast perfectly in a transverse direction. The prior art means referred to are in fact located underneath the heel and exert no resistance against the pivotal movement.

The similarity with prior art consists in the use of the dished member the bottom section of which is removed, whereas the circular ring may rock under the edge of a further dished member of which the bottom is rigid with the ski. Said other dished member is constituted, as illustrated, by two discs 14' and 15' which are rigidly secured together. The front lower part of the disc 44 is provided with a slot 2, whereas its rear section extends so as to form a lug 43 provided with a hole 2'.

Said lug 43 is housed inside a horizontal notch formed in a vertical member 46 the front surface of which, showing said notch, is incurved so as to allow a rotation of the lug of the dished member.

Conventional locking elements such as the ball 1', the spring 5, adjusting screw 6 and tube 8 are housed in the vertical member 46 so that the ball 1' may be urged by the spring 8 into the opening 2' in the lug 43. The vertical member 46 and also the discs are secured to a rectangular plate 47 which is almost as broad as the ski and extends forwardly of the edge of the dished member. Said plate 47 is rigidly secured to the ski, either by screws or else as illustrated in FIG. 6 it is urged against the ski under a slideway including for longitudinal adjustment striations 31 cooperating with the striations 33 of a member 32 adapted to be vertically shiftable against the rear end of the member 46 on which it is possibly secured by a screw 34 as illustrated cross-sectionally to one side of FIG. 8. The front of the plate 47 is provided with an elongated boss 11 holding the male element cooperating with the slot 2 forming the female element. In order to secure the block B on the upper edge 58 of the dished member, the plate 47 is provided with openings 49 which allow the passage of the screw or of the rivet heads 49' (FIG. 8) which serves for said securing. It is apparent that the constant resistance against pivotal movement of the system constituted by the block B in a dished member is obtained by engagement inside the opening 2' in the lug 43 of the ball 1' urged by the spring 5 adjusted by the screw.

If the arrangement is designed so as to benefit by a resistance proportional to the skier's weight, a slight clearance is left between the peripheries of the discs and the dished member, so that a downward thrust exerted by the spring 5 on the lug 43 produces to the front a rising movement and consequently a release of the slot 2 with reference to the elongated boss 1. The engagement between the boss and slot is obtained by depressing the heel onto the pedal P which produces a slight downward rocking movement of the front of the system constituted by the block B and dished member. Most of the blocks ensuring axial safety include for the automatic fitting of the shoe a pedal secured to their cover C. If such an arrangement is left out, the pedal is secured to the front of the block B.

With certain blocks, the vertical member 46 may be in the way and can be replaced by the arrangement illustrated in FIGS. 4 and 5, such an arrangement being much less high by reason of the presence of the Belleville washers and of the frusto-conical washers.

It should be remarked that the arrangement according to FIGS. 7 to 9 cannot be detrimentally affected by the transverse bulging of the ski. Said advantage has already been referred to when describing FIGS. 4 and 5.

FIGS. 10 to 12 illustrate an embodiment wherein the block B provided for axial safety does not pivot and serves no longer as an element holding the heel laterally fast. Said part is played by two pivotal flaps extending to either side of the block and carrying heel guides provided with means urging said flaps against the lower part of the heel.

The block B is secured above two plates 60 and 61 separated by a stay 62, the rear of which has a breadth which is substantially equal to that of the block B whereas the breadth of its front is substantially equal to that of the ski. To said front end is rivetted a steel spring blade 62 the rear end of which is urged downwardly and carries bosses forming the male element.

The upper plate 60 stops short of the rear of the spring blade and includes two kidney-shaped gates 64. To each side, a washer 65 the thickness of which is equal to that of the stay, is welded to one of the plates and is assembled by a tubular rivet 65 after positioning of the pivotal elements formed by two flaps 3 pivotally secured over the rivet 65. The flaps are provided to the front with two openings 2 which form the female element cooperating with the bosses 1, the flaps being provided with slashes 67 inside which are rivetted two vertical stays 66, the lower plate is provided with two further kidney-shaped gates 64' which are broader and allow riveting the stays 66 in the slashes of the flaps.

The horizontal arms 71, 72 of a member 70, in the shape of a horizontally lying U are provided each with two openings 73, 74 and 75, 76 whereas its vertical web 77 is provided with an opening 77' wherein a shouldered screw 78 provided with a clip 79 revolves freely. Said screw is screwed into the vertical arms 81 of a strap 80. The horizontal web 82 of the latter is provided with an opening 66' through which passes the vertical stay 66 riveted without any locking of the arm 72 in the elongated opening 76. A rivet 84 extends through the openings 73 and 75 and also through the openings 73', 75' of a second U-shaped member 85 to the vertical web of which are welded the heel guides 86 which are slightly incurved and striated at 87. The upper ends 88 of the heel guide slope slightly rearwardly.

It is apparent that the screw 77' and member 85 provide a perfect contact with the heel.

The lateral stress exerted by the heel on the guide-carrying means for instance on the right-hand side urges the stay 66 into an outer position 66'. However, since the vertical arm 77 abuts against the side of the block B the shifting of the front of the U-shaped member 70 is amplified whereas the movement of the front of the flap is slight.

When no weight is acting on the steel blade, only the constant resistance of the elements 1 and 2 is to be overcome and if the weight of the body is actually present on said blade, the resistance will be strictly proportional to said weight.

Figure 13:
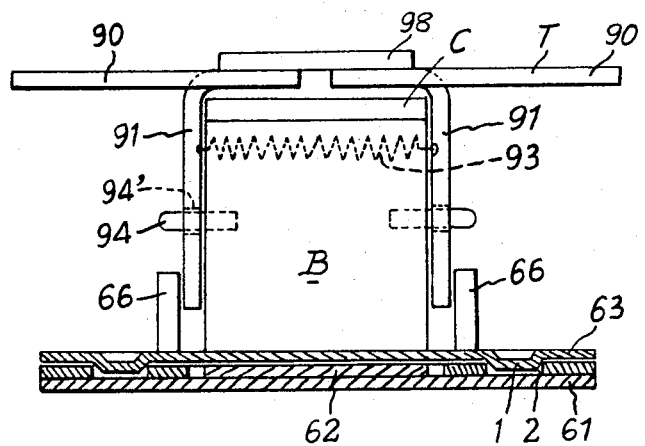

The arrangement illustrated in FIG. 13 is derived from that illustrated in FIGS. 10 and 11 and forms a view from the front.

To the rear of the cover C of the heel-engaging block are pivotally secured two heel-bearing flaps 90 including flanges 91 fitted between the sides of said block and vertical stays 66. The flaps may if, required, be urged back by a spring 92. The horizontal sections of the flap terminate with arcuate surfaces T which are spaced so as to properly encase the shoe above the groove in the heel on which they bear as provided by the axial safety system. Means are provided for preventing a flexing of the two bearing flaps for instance by means of a bar 92 secured to the cover C of the block.

In the case where the block is pivotally secured round a horizontal axis to a strap, the heel engaging flaps are secured to the upper surface of the block and instead of the bar 92 two studs 94, 94' are secured to the sides of the block in front of holes provided in the flanges 91, as shown on the left-hand side of FIG. 13.

The advantage of said modification results in a spacing of the bearing surface engaging the groove in order to ensure a proper engagement with the ski edges, since the arcuate surface T of the axial safety means fitted on our improved rotary system cannot be given such a breadth.

Turning to FIGS. 14 to 16, they illustrate an arrangement which is extremely simplified and wherein the members of the axial safety means are considerably spaced and engage the groove in the heel and are fitted on a member rocking rearwardly and to which we have secured heel guiding members.

The plates 12 and 13 of FIGS. 2 and 3 are retained together with the discs or plates 14 and 15, but the lower disc 15 carries no longer any lugs. The upper plate is provided with two notches forming the female element 2 engaged by two bosses 1 raised underneath the front end of a spring blade 100 rotating in unison with the discs, as provided by two screws or rivets. Two openings 101 receive the screws 103 which serve for securing the lower part of the axial safety means through a longitudinally shiftable member 104 extending above the spring and underneath the lower part of the axial safety means, the part 104 being provided with elongated ports.

The arrangement which is partly illustrated is Miller's comparatively old axial safety system which includes a bracket 105 provided with upstanding lugs 106 through which passes a horizontal spindle 107 serving as an axis for a rocking support 108 carrying at its upper end two members engaging the grooves in the heel which heel is not illustrated in FIG. 15. The heel-engaging members 112 are spaced comparatively wide apart and their front edges form short arcuate surfaces.

The vertical surface of the rocking member 108 is in the shape of a U the arm of which 109 are provided with openings 107' for the spindle 107 and two tapped openings 110 for the screws 110' carrying clips 111 with a view to controlling the transverse shifting of the heel guides 112 each provided at the rear end with a notch 113 the sides of which are provided with smooth openings 114 engaged by screws.

The preferably arcuate front surfaces of the seel guides are provided with striations 87 as in the case of FIGS. 10 and 11.

The skier brings easily the heel guides into contact with the lower part of the heel by acting on the screw heads 110'. This forms a guiding which is far superior to the guiding by the arcuate surfaces T extending above the heel grooves. Furthermore, the heel guides which are carried by a rocking member assume a sloping position when they recede. This furthers considerably the positioning and centering of the heel.

As to the lateral safety resistances, it is apparent that they are controlled by the sole spring 100. In the absence of weight acting on it, the constant resistance is the result of the bearing stress exerted by the spring and if weight is exerted on said spring, the resistance is now strictly proportional to the weight.

For extreme cases such as that of a skier turning often in a jerky manner or in the case of a high speed skier, the constant resistance may be increased by a forward shifting of the part 114 which is locked again by the screws.

What I claim is:

1. In combination with the axial safety block of a safety system securing a skier's shoe between said block and a front stop, the provision of a unit comprising a support including a shouldered disc and a substantially flat element in superposed relationship with the disc and provided with an arcuate recess in which the disc is revolvably fitted, one of said cooperating parts, the disc and the flat element being secured to the ski and the other to the block to pivot therewith, and a yielding locking system opposing the pivotal movement of the part secured to the block and including at least one pair of interengageable male and female sections formed on the said cooperating parts and adapted to provide a constant resistance against torsional stresses and the interengagement of which is controlled by the skier's weight.

2. A unit as claimed in claim 1, wherein the yielding locking system includes two elementary locking means located respectively to the front and to the rear of the unit and adapted to provide respectively a constant resistance and a resistance depending on the skier's weight.

3. A unit as claimed in claim 1, wherein the flat element is provided with a short radial slot to the front of its periphery and includes a raised peripheral flange and forms the part secured to the block, and the yielding locking system includes dual means rigid with the ski and cooperating respectively with the slot in the flat element and with the rear portion of the peripheral flange of the latter.

4. A unit as claimed in claim 1, wherein the interengageable male and female sections are located to the front of the support.

5. A unit as claimed in claim 1, comprising a flat spring blade secured to the part revolving with the block and provided with an indented section forming a male section for the locking system.

6. A unit as claimed in claim 1, wherein the shouldered disc is secured to the ski with the shoulder uppermost to form a peripheral gap between said shoulder and the ski and the flat element is secured to the block and includes along its arcuate recess, a depressed flange engaging said gap.

7. A unit as claimed in claim 1, wherein the shouldered disc is rigid with the ski and its shoulder periphery is raised above the surface of the latter to carry the corresponding section of the yielding locking system.

References Cited

UNITED STATES PATENTS 3,179,434   4/1965   Minisini _____ 280—11.35

FOREIGN PATENTS 1,350,289   12/1963   France.

BENJAMIN HERSH, *Primary Examiner.*

L. D. MORRIS, JR., *Assistant Examiner.*